Patented June 11, 1940

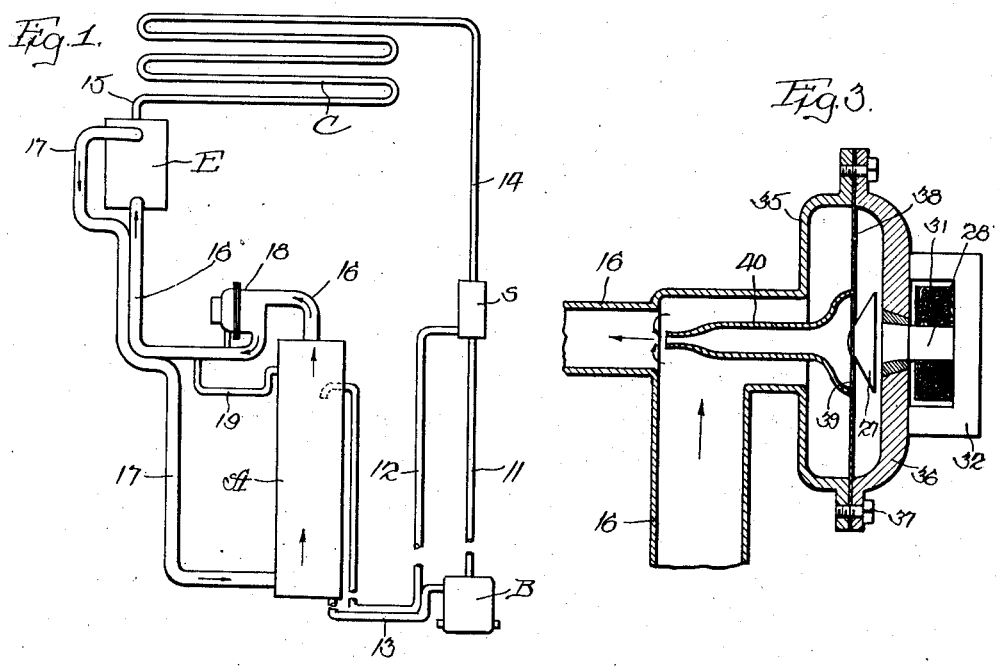
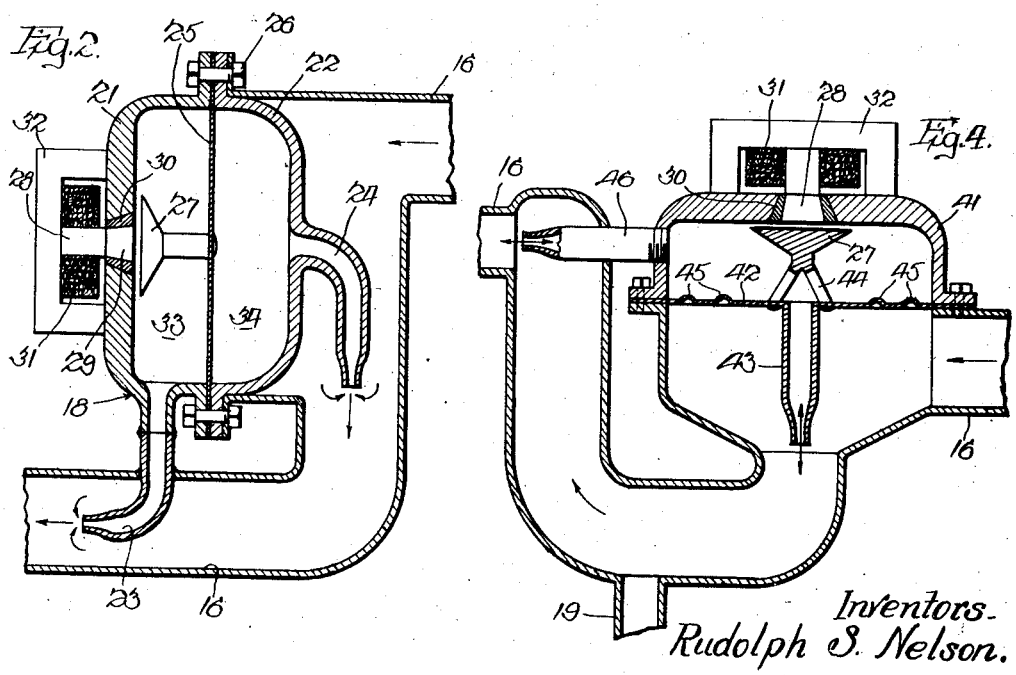

2,204,226

UNITED STATES PATENT OFFICE 2,204,226

ABSORPTION REFRIGERATING APPARATUS

Rudolph S. Nelson, Larchmont, N. Y., assignor to The Hoover Company, North Canton, Ohio, a corporation of Ohio Application June 10, 1935, Serial No. 25,732
Renewed October 27, 1939

18 Claims. (Cl. 62—119.5)

This invention relates to continuous absorption refrigerating apparatus of the type in which an inert gas is employed and more particularly to means for circulating the inert gas.

Continuous absorption refrigerating systems in which an inert gas is employed and in which it is circulated by power driven means such as a fan have been proposed heretofore, but have not been perfected. In order to circulate the inert gas by means of a fan, however, it is necessary to extend the fan shaft through a wall of the apparatus to a driving motor. This presents the disadvantage that the apparatus is liable to leak, especially after the parts which move have become worn. It also presents the problem of providing a structure in which the apparatus will have long life since the bearings for the shaft are apt to corrode especially if subjected to fluids in the system which have a corrosive effect upon the metals employed.

It is one object of the present invention to provide an improved gas circulating means adapted for use in absorption refrigerating systems but in which the disadvantages and the defects cited by way of example hereinabove are overcome.

It is a further object of the invention to provide gas circulating means which will have long life, which will be practically noiseless, which will have low operating cost and which can be inexpensively manufactured.

Other objects and advantages reside in certain novel features of the arrangement and construction of parts as will be apparent from the following description taken in connection with the accompanying drawing, in which:

Figure 1 is a diagram of a continuous absorption refrigerating system in which one form of the present invention is incorporated;

Figure 2 is a vertical cross-sectional view of the gas circulating device shown in Figure 1;

Figure 3 is a vertical cross-sectional view of another embodiment of a gas circulating device constructed in accordance with the invention; and Figure 4 is a vertical cross-sectional view of still another embodiment of a gas circulating device constructed in accordance with the invention.

Referring to the drawing in detail and first to the diagrammatic illustration in Figure 1, it will be seen that a continuous absorption refrigerating system is illustrated as consisting of a boiler B, a vapor separation chamber S, a condenser C, an evaporator E, and an absorber A as essential elements, these devices being connected by a number of conduits to form the complete refrigerating system.

The boiler B is connected to the vapor separation chamber S by means of the conduit 11 which may act as a vapor lift pump to convey both absorption liquid and refrigerant vapor into the vapor separation chamber S. From this chamber the liquid flows into the absorber A through the U-shaped conduit 12. The absorber A may consist merely of a vertical tank with a number of baffle plates therein. The absorption liquid supplied to the upper end thereof by the conduit 12 trickles downwardly over the baffles and leaves the absorber through the conduit 13 through which it flows back to the boiler B. The conduits 12 and 13 may be in heat exchange relation as illustrated.

Refrigerant vapor generated in the boiler B, the conduit 11, or the vapor separation chamber S passes upwardly through a conduit 14, a portion of which may act as a rectifier, and into the condenser C. The condenser C may consist merely of a coil of pipe so arranged that the refrigerant vapor supplied thereto, upon being cooled, condenses and flows into the evaporator E through the conduit 15.

The evaporator E may consist merely of a vertical tank provided with baffle plates. It is connected to the absorber by means of two inert gas conduits designated as 16 and 17, the conduit 16 having a gas circulating device or pump, represented generally by the reference number 18, incorporated therein. As illustrated in Figure 1, the conduit 16 connects the top of the absorber to the bottom of the evaporator. The conduit 17, on the other hand, connects the top of the evaporator to the bottom of the absorber. The conduits 16 and 17 can be in heat exchange relation over a portion of their path as illustrated in Figure 1.

When inert gas is circulated between the evaporator and the absorber, the refrigerant supplied to the evaporator in liquid form evaporates to produce cooling effect and is conveyed into the absorber where it is absorbed by the absorption liquid flowing therethrough and thus returned to the boiler B.

In accordance with known practices water may be used as the absorption liquid, ammonia as the refrigerant and hydrogen as the inert gas in the evaporator and the absorber.

In order to prevent any liquid which may not have evaporated in the evaporator E from interfering with the proper operation of the gas circulating device 18 a small liquid conduit 19 may be connected to the lower portion of the conduit 16 and to the absorber to drain any liquid from this conduit into the absorber.

The gas circulating device 18 of Figure 1 is shown in detail in Figure 2. Essentially the arrangement consists of two cup-shaped members 21 and 22 having nozzles 23 and 24 integral therewith or secured thereto together with a diaphragm 25, which is adapted to be secured between the cup members 21 and 22 by means of the bolts 26, and electro-magnetic means for vibrating the diaphragm 25.

For vibrating the diaphragm 25, an armature 27 is riveted or otherwise secured to it. This armature is moved back and forth by means of an electro-magnet mounted upon the member 21. The core of the electro-magnet includes a stud bolt 28 having a tapered head 29 which is tightly fitted within a non-magnetic ring 30 which is also tapered and tightly fitted within a hole in the side of the member 21. A coil 31 surrounds the outer portion of the bolt 28 and is in turn covered by another portion 32 of the core which may be cup-shaped and be built up of laminated sheets of magnetic material. The portion 32 of the core is tightly fitted against the outer end of the bolt 28 and against the casing member 21 so that when alternating current is passed through the coil 31 a magnetic circuit is set up. The magnetic circuit includes the bolt 28, the outer core piece 32, the portion of the casing 21 surrounding the non-magnetic ring 30 and the armature 27. The casing member 21 may be made entirely of steel or other magnetic material or only the portion adjacent the ring 30 may be made of magnetic material. With this construction a strong magnetic field is set up through the armature 27 and there is no danger of leakage of gases through the wall of the casing member 21, there being but one opening in this casing and this being completely filled by the non-magnetic ring 30 and by the stud bolt 28.

The cup-shaped members 21 and 22 with the diaphragm 25 clamped therebetween from two chambers 33 and 34 on the opposite sides of the diaphragm. The nozzle 23 may be integrally secured to the cup-shaped member 21 so as to be connected to the chamber 33 while the nozzle 24 may be integral with the member 22 so as to be connected to the chamber 34.

As illustrated in Figure 2 one way of mounting the pump 18 in the conduit 16 is provided by means of the bolts 26, the conduit 16 having a flanged opening therein so that the pump assembly 18 can be secured thereto. The nozzle 23 may consist of two parts, the upper part being integral with the casing member 21 and the lower part consisting of a small tube welded or integrally secured with a portion of the conduit 16. This permits ease of assembly, the two parts of nozzle 23 being welded together after the casing members 21 and 22 are secured to the conduit 16.

As the diaphragm 25 is vibrated back and forth by the electro-magnetic means the volume of each chamber 33 and 34 changes slightly. The change of volume in these chambers causes gas to be alternately sucked in and expelled through the nozzles 23 and 24. The gas sucked into the nozzles mostly enters from a plane at right angles to its longitudinal dimension while that which is expelled moves forward in the direction the nozzle is pointing when the diaphragm vibrates at a rather rapid rate (for example, when the magnet is energized by 60 cycle A. C.), gas leaving the nozzle has the appearance of practically a continuous jet. This jet causes the gas to move forward through the conduit 16 and over the remainder of its circuit as indicated by arrows in Figure 1.

It will thus be seen that the pump arrangement of Figure 2 is double acting in its nature although the nozzles 23 and 24 act independently of each other. It will also be seen that the nozzles 23 and 24 remain stationary, only the diaphragm 25 and the armature 27 moving in the arrangement of Figure 2. Since the gas is drawn into and expelled from the chamber 33, in which the armature is located, the constant change of gas in this chamber cools the armature.

It is possible to provide an arrangement in which one or more of the nozzles employed in the gas-pumping device constructed in accordance with the invention move back and forth with the diaphragm. In Figure 3 an arrangement is shown in which only one nozzle is employed, this nozzle being mounted for movement with the diaphragm, and in Figure 4 an arrangement is shown in which two nozzles are employed, one of which is mounted for movement with the diaphragm and the other of which is stationary.

In the arrangement of Figure 3 the conduit 16, which may be part of a refrigerating system like that of Figure 1, has an enlarged portion 35 thereon to which a casing or circular covering 36 is secured by means of the bolts 37, a diaphragm 38 being clamped therebetween. The casing 36 may have an electro-magnet structure secured thereto which is identical to the structure shown in Figure 2 and is similarly designated. Likewise the diaphragm 38 has an armature 27 riveted or otherwise secured thereto. The diaphragm 38 differs from the diaphragm 25 of Figure 2, however, in that it is provided with openings near its central portion as illustrated at 39. A nozzle 40 having an enlarged base portion is rigidly and tightly secured to the central portion of the diaphragm 38 on the outside of the openings 39.

Thus when the diaphragm 38 is vibrated by the electro-magnet the volume of the chamber formed by the diaphragm 38 and the casing 36 changes and this causes gas to enter and leave the chamber through the nozzle 40, the action being the same as that described in connection with the nozzles 23 and 24, the only difference being that in Figure 3 the nozzle 40 also moves back and forth with the diaphragm. As in Figure 2, a jet of gas leaves the end of the nozzle and the armature is cooled by the passage of gas through the chamber in which it is located.

In the arrangement of Figure 4 still a different embodiment of the invention is illustrated. As in the figures previously described, the gas circulating device of Figure 4 is illustrated as mounted in the conduit 16 of the refrigerating system shown in Figure 1. In this arrangement the cup-shaped casing member 41, similar in structure to those previously described, is bolted in a horizontal position to an enlarged portion of the conduit 16 with a diaphragm 42 therebetween. The diaphragm 42 has a central opening in which a movable nozzle 43 is secured so that the nozzle 43 moves when the diaphragm is vibrated by means of the armature 27 and the electro-magnetic means like that described in Figure 2 and which is similarly designated.

In the arrangement of Figure 4 the armature 27 is shown spaced some distance from the diaphragm 42 and secured thereto by connecting bars 44. The diaphragm may be provided with circular crimps or wrinkles as illustrated at 45 in order to increase its flexibility if desired.

A fixed nozzle 46 is integrally connected with the casing member 41 and with the upper left-hand portion of the conduit 16, (as viewed in Figure 4) so as to make the gas-circulating device of Figure 4 double acting also.

The arrangement of Figure 4 differs from that of Figure 2 in that the jets of gas directed out of the nozzles 43 and 46 are the result of a change in volume in only one chamber. As the diaphragm moves upwardly in Figure 4 gases are expelled through both nozzles 43 and 46 to create the jets and when the diaphragm moves downwardly air enters the chamber between the diaphragm 42 and the casing 41 through both nozzles 43 and 46. This pump thus has different characteristics from that of Figure 2 in which each nozzle is provided with its own chamber. In all of the arrangements shown, the cup-shaped casing members are shown as having considerable volume therein. This showing is for purposes of illustration only. In actual construction, the cups are made as shallow as possible in order to keep the volumes of the chambers formed by them and the diaphragm small, since this aids in causing a pumping action through the nozzles even though the diaphragm movement is small.

While in all of the embodiments of the invention shown the parts of the casing of the pump have been shown as bolted together, it is obvious that other clamping means may be employed or the parts welded together. Also, it is within the purview of the invention to make the outer portion of the bolt 28 of laminated material or make this part of the magnetic circuit integral with the part 32. Various other changes may be made in the construction or arrangement of parts without departing from the spirit of the invention or the scope of the annexed claims.

I claim:

1. A fluid circulator adapted for use in a continuous absorption refrigerating system, said circulator including fluid conduit means, a movable element, electromagnetic means for actuating said movable element, means forming chambers on the opposite sides of said element, a nozzle connected to each of said chambers and to said fluid conduit means, the arrangement being such that fluid may be drawn from said fluid conduit means into the chambers through each of said nozzles and expelled therefrom in the form of jets into said fluid conduit means when said electromagnetic means is energized whereby said jets aid each other in maintaining flow in the conduit means.

2. A fluid circulator adapted for use in a continuous absorption refrigerating system, said circulator including fluid conduit means, a movable element, means for actuating said movable element, means cooperating with said movable element to form a chamber of varying volume and a nozzle mounted on said movable element and connected to said chamber, the arrangement being such that fluid may be drawn from said conduit means through said nozzle into said chamber and expelled therefrom through said nozzle into said conduit means upon movement of said movable element.

3. A gas pump adapted for circulating inert gas in a fluid conduit means of a continucus absorption refrigerating system, said pump including a casing adapted to be hermetically sealed to said system, a diaphragm mounted for vibratory movement in said casing, electromagnetic means for actuating said diaphragm and a plurality of nozzles, one of which is mounted on said casing and another of which is mounted on said diaphragm, the arrangement being such that gas is alternately drawn from said conduit means in through said nozzles and then expelled therefrom in the form of jets into said conduit means upon vibratory movement of said diaphragm.

4. A gas pump adapted to circulate inert gas in a fluid conduit means of a continuous absorption refrigerating system, said pump including means for forming a chamber, a movable element for varying the volume of the chamber and a nozzle mounted on said movable element, the arrangement being such that gas may be drawn from said conduit means into said chamber through said nozzle and expelled therefrom through said nozzle in the form of a jet into said conduit means in response to changes of volume in said chamber resulting from movement of said movable element.

5. A fluid pump comprising a conduit, an enlarged chamber communicating therewith, a diaphragm dividing the latter into two chambers, and means comprising a nozzle communicating with both of said chambers and having a discharge end extending along said conduit and operable to remove alternately fluid from said conduit along the lateral sides of said nozzle on one side of said diaphragm when the volume on the other side thereof is increased, and for discharging gas co-axially of said nozzle when the volume on said other side is decreased whereby uni-directional movement of the fluid in said conduit takes place.

6. A fluid pump adapted to circulate fluid through conduit means of an absorption refrigerator, comprising a casing for cooperating with the conduit means, movable means forming a chamber with said casing, nozzle means carried by said movable means and communicating with said conduit means and chamber, and means for actuating said movable means to draw portions of fluid through said nozzle means from the main body of fluid in said conduit means into said chamber and to eject therefrom said portions of fluid into said conduit means to effect directional movement to said main body of fluid.

7. A fluid pump adapted to circulate fluid through conduit means of an absorption refrigerator, comprising a casing for cooperating with the conduit means, movable means forming a chamber with said casing, nozzle means carried by said movable means and communicating with said conduit means and chamber, and electromagnetic means for actuating said movable means including an armature carried by the latter, said electro-magnetic means actuating said movable means to draw portions of fluid through said nozzle means from the main body of fluid in said conduit means into said chamber and to eject therefrom said portions of fluid into said conduit means to effect directional movement to said main body of fluid.

8. A fluid pump adapted to circulate fluid through conduit means of an absorption refrigerator, comprising a casing for cooperating with the conduit means, movable means forming a chamber with said casing, nozzle means carried by said movable means and communicating with said conduit means and chamber, nozzle means communicating with said chamber and conduit means, and means for actuating said movable means to draw portions of fluid through each of said nozzle means from the main body of fluid in said conduit means into said chamber and to eject therefrom said portions of fluid into said conduit means to effect directional movement to said main body of fluid.

9. A fluid pump adapted to circulate fluid through conduit means of an absorption refrigerator, comprising a casing for cooperating with the conduit means, movable means forming a pair of chambers with said casing, a nozzle communicating with said conduit means and one of said chambers, another nozzle communicating with the other of said chambers and said conduit means, and means for actuating said movable means to draw portions of fluid from the main body of fluid in said conduit means through each of said nozzles into its respective chamber and said nozzle being so arranged as to eject therefrom said portions of fluid into said conduit means to assist one another in effecting directional movement to said main body of fluid.

10. In an absorption refrigerating system using an inert gas and including an evaporator and an absorber interconnected by inert gas conduits, a gas pump located in a certain one of said conduits for circulating the inert gas through said conduits, said pump including a casing, a diaphragm mounted for vibratory movement in said casing and cooperating with a portion of the casing to form a chamber, electro-magnetic means mounted on said portion of said casing for vibrating said diaphragm whereby the volume of the chamber is varied so that gas is alternately drawn in and expelled, and a nozzle associated with said casing and diaphragm for causing a jet of gas to be expelled therefrom in response to movement of said diaphragm, said nozzle being connected to the chamber formed between the diaphragm and the portion of the casing on which the electro-magnetic means is mounted whereby gas serves to cool the electro-magnetic means, said certain one of said conduits providing means for conveying residue liquid from said evaporator to said absorber, and means for by-passing said residue around said gas pump.

11. In an absorption refrigerating machine having an evaporator and an absorber and using an inert gas, a gas pump for circulating the inert gas through conduits between the evaporator and absorber, one of said conduits serving as an evaporator drain, said pump being positioned in said drain conduit, and a by-pass for evaporator drainage around said pump.

12. In an absorption refrigerating machine having an evaporator and an absorber and using an inert gas, a gas pump for circulating the inert gas through conduits from the absorber to the evaporator and back to the absorber, said pump lying in the conduit from the absorber to the evaporator which serves as an evaporator drain, and a by-pass for the evaporator drainage around said pump, whereby the pump cannot be hindered by the counterflow of said drainage.

13. In an absorption refrigerating system using an inert gas, a gas pump for causing the inert gas to circulate, said pump including a casing hermetically sealed to a part of said system, a diaphragm mounted for vibratory movement in said casing and cooperating with a portion of the casing to form a chamber, electromagnetic means mounted on said portion of said casing for vibrating said diaphragm whereby the volume of the chamber is varied so that gas is alternately drawn into and expelled from said chamber, and a nozzle associated with said casing and diaphragm for causing a jet of gas to be expelled therefrom in response to movement of said diaphragm, said nozzle being connected to the chamber formed between the diaphragm and the portion of the casing on which the electromagnetic means is mounted whereby the gas serves to cool the electromagnetic means.

14. A fluid circulator adapted for use in an absorption refrigerating system, said circulator including a fluid conduit means and a movable element, means for actuating said movable element, means cooperating with said element to form a chamber of varying volume including said actuating element, and a plurality of spaced nozzles connected to said chamber, the arrangement being such that the volume of said chamber may be varied in response to movement of said element thereby causing fluid to be drawn into and expelled from said chamber through first one and then the other of said nozzles, said nozzles and said conduit being so arranged as to assist one another in imparting movement to the main stream at spaced points in the conduit.

15. A double acting fluid circulator adapted for use in an absorption refrigerating system, said circulator including fluid conduit means, a movable element, means for actuating said movable element, means cooperating with said movable element to form a plurality of chambers, and a plurality of nozzles, one of which is connected to each of said chambers, the arrangement being such that fluid from said fluid conduit means may be drawn into and expelled from said chambers through each of said nozzles upon movement of said movable element so that each of said nozzles cooperates in producing uni-directional flow of the main body of fluid in said fluid conduit means.

16. A gas pump adapted for circulating inert gas in an absorption refrigerating system, said pump including a casing adapted to be hermetically sealed to said system, a diaphragm mounted for vibratory movement in said casing, and being so positioned as to form a plurality of chambers, electromagnetic means for actuating said diaphragm and a nozzle connected with each of said chambers, the arrangement being such that gas is simultaneously drawn through one of said nozzles and expelled from another thereof upon a forward movement of the diaphragm and the said gas flow reversed upon a backward movement of the diaphragm.

17. The method of displacing a fluid stream comprising removing portions of said stream radially inward to a focal point by means of a vibratable member and suddenly imparting outward movement to said portions by a movement of said member in a direction parallel to the stream while simultaneously employing said sudden movement of the member to perform in reverse order the same operations on another portion of the stream, whereby a steady uni-directional flow of said stream is produced.

18. In an absorption refrigerating apparatus a pump for circulating a medium in said apparatus comprising a diaphragm positioned on the interior of said apparatus and forming a chamber with the walls of said apparatus, a jet secured to said diaphragm and electro-magnetic means exteriorly of the apparatus for vibrating said diaphragm whereby the medium is alternately drawn into and expelled from said chamber in a manner to propel the medium in the apparatus.

RUDOLPH S. NELSON.